United States Patent
Albertson et al.

(10) Patent No.: US 7,019,414 B2
(45) Date of Patent: Mar. 28, 2006

(54) ALTERNATOR LOAD CONTROL TO EXTEND DISPLACEMENT ON DEMAND RANGE

(75) Inventors: William C. Albertson, Clinton Township, MI (US); Mike M. Mc Donald, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/874,088

(22) Filed: Jun. 22, 2004

(65) Prior Publication Data

US 2005/0280263 A1    Dec. 22, 2005

(51) Int. Cl.
*B60L 11/12*    (2006.01)
(52) U.S. Cl. .................. 290/40 B; 290/40 B
(58) Field of Classification Search ............... 290/40 B
See application file for complete search history.

(56) References Cited

U.S. PATENT DOCUMENTS

| | | | | |
|---|---|---|---|---|
| 3,918,543 A | * | 11/1975 | Halem ..................... 180/282 |
| 6,694,948 B1 | * | 2/2004 | Glugla et al. ............ 123/404 |
| 6,817,336 B1 | * | 11/2004 | Glugla et al. ............ 123/198 F |
| 6,823,840 B1 | * | 11/2004 | Tamai et al. ............. 123/352 |

* cited by examiner

*Primary Examiner*—Joseph Waks
(74) *Attorney, Agent, or Firm*—Christopher DeVries

(57) ABSTRACT

An engine control system controls engine operation in activated and deactivated modes in a displacement on demand engine. The engine control system includes an alternator that is driven by the engine and that is regulated by a load control signal. An alternator load control module generates the load control signal based on a manifold absolute pressure (MAP) and an energy storage device state of charge to regulate a load of the alternator on the engine to maintain the MAP below a threshold level and within an efficient operating range.

14 Claims, 7 Drawing Sheets

ALTERNATOR LOAD CONTROL TO EXTEND DISPLACEMENT ON DEMAND RANGE

FIELD OF THE INVENTION

The present invention relates to internal combustion engines, and more particularly to engine control systems that control engine operation in a displacement on demand engine.

BACKGROUND OF THE INVENTION

Some internal combustion engines include engine control systems that deactivate cylinders under low load situations. For example, an eight cylinder engine can be operated using four cylinders to improve fuel economy by reducing pumping losses. This process is generally referred to as displacement on demand or DOD. Operation using all of the engine cylinders is referred to as an activated mode. A deactivated mode refers to operation using less than all of the cylinders of the engine (one or more cylinders not active).

In the deactivated mode, there are fewer cylinders operating. As a result, there is less drive torque available to drive the vehicle driveline and accessories (e.g., alternator, coolant pump, A/C compressor). Engine efficiency, however, is increased as a result of decreased fuel consumption (i.e., no fuel supplied to the deactivated cylinders) and decreased engine pumping. Because the deactivated cylinders do not take in and compress fresh intake air, pumping losses are reduced.

During typical engine operation in the deactivated mode, there are many operating points at low intake manifold absolute pressures (MAP). At low MAPs, the engine pumping losses are higher than at higher MAPs. That is to say, the engine is still not operating as efficiently as desired when operating in the deactivated mode at a low MAP. Additionally, there are many operating points at or near the MAP threshold, which defines the transition point between activated and deactivated modes. Once in the deactivated mode, hysteresis often delays transition back into the deactivated mode. Both of these conditions result in missed opportunities to reduce fuel consumption.

SUMMARY OF THE INVENTION

Accordingly, the present invention provides an engine control system for controlling engine operation in activated and deactivated modes in a displacement on demand engine. The engine control system includes an alternator that is driven by the engine and that is regulated by a load control signal. An alternator load control module generates the load control signal based on a manifold absolute pressure (MAP) to regulate a load of the alternator on the engine to maintain the MAP below a threshold level and within an efficient operating range.

In other features, the engine control system further includes an energy storage device that is charged by the alternator. The load control signal is further based on a state of charge (SOC) of the energy storage device.

In another feature, the load is inversely proportional to the MAP.

In still another feature, the load increases as the MAP decreases to maintain the MAP within the efficient operation range.

In yet another feature, the load decreases as the MAP increases to maintain the MAP below the threshold level.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
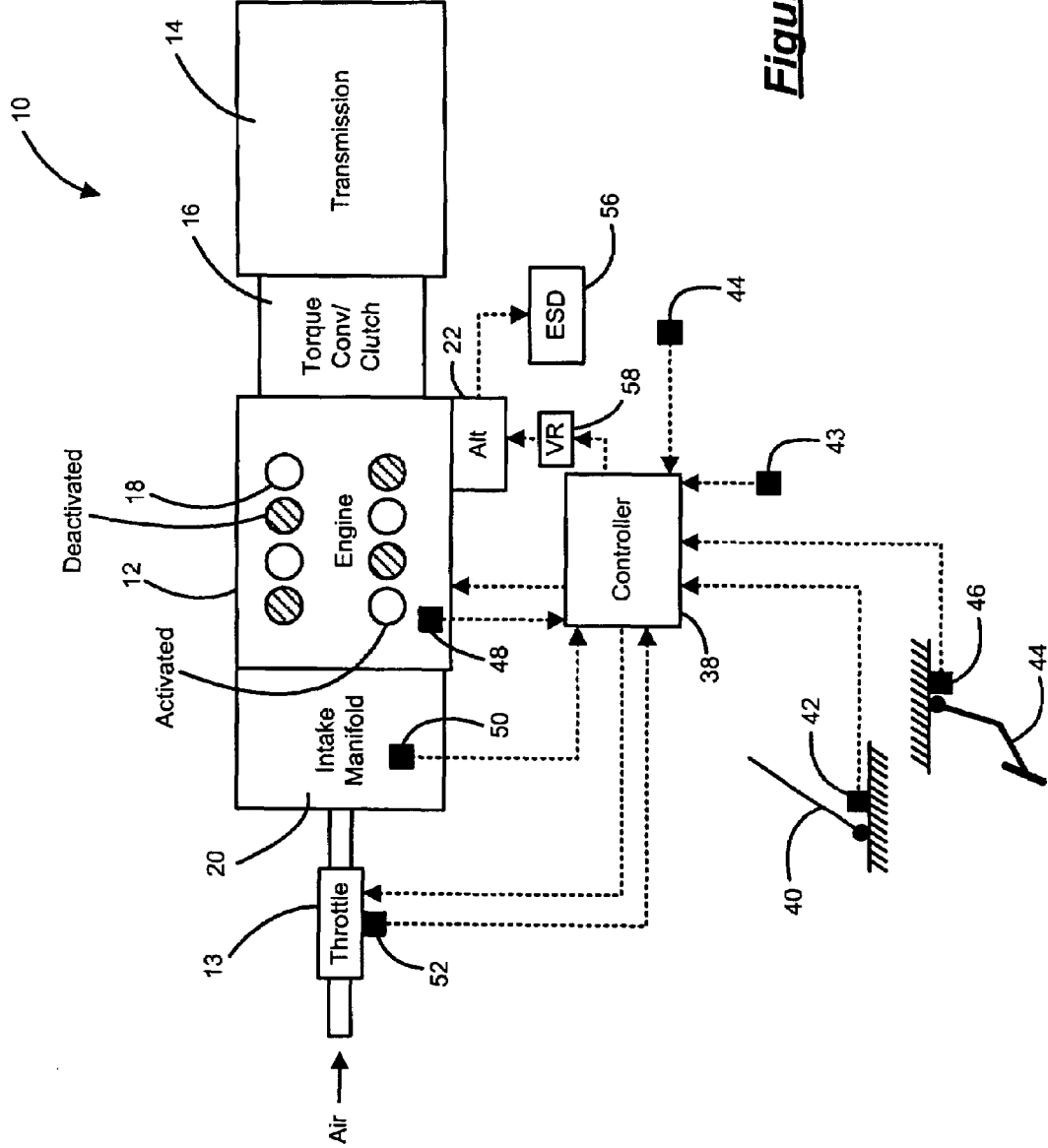
FIG. 1 is a functional block diagram illustrating a vehicle powertrain including a displacement on demand (DOD) engine control system according to the present invention.

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 2:
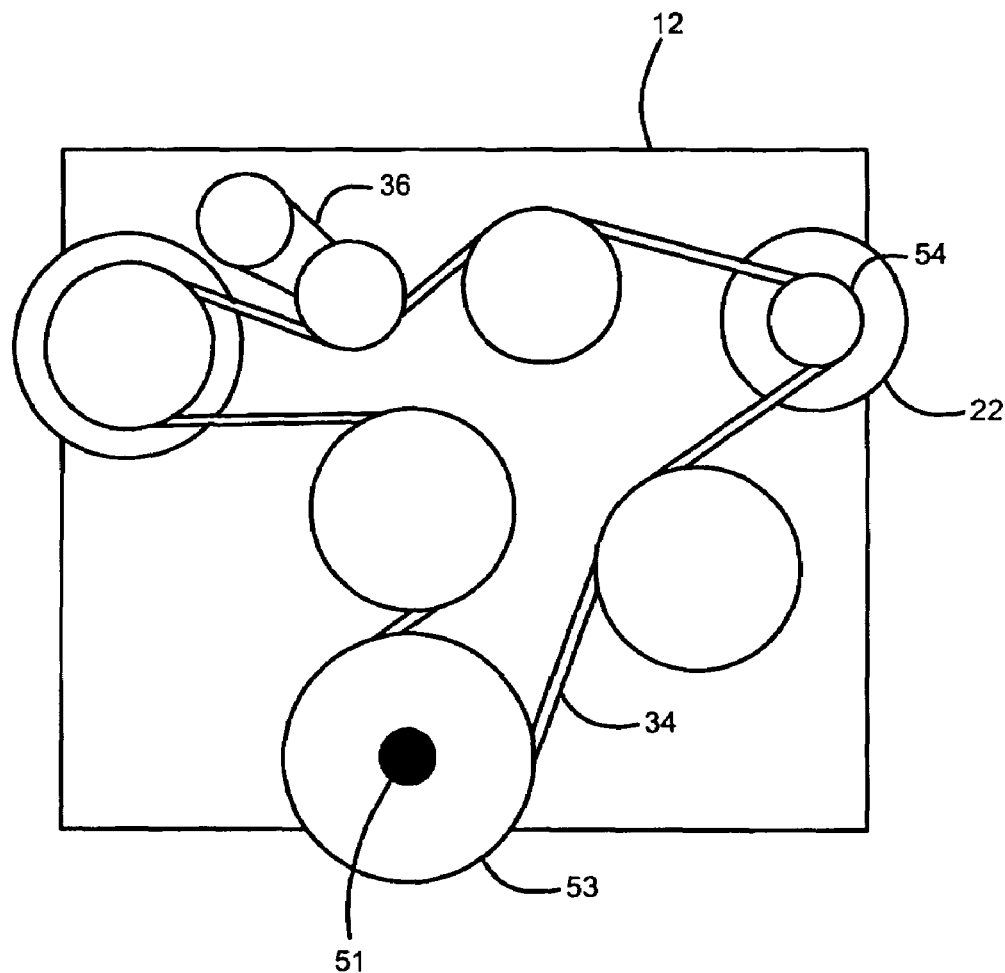
FIG. 2 is a schematic front view of the engine of FIG. 1.

Referring now to FIGS. 1 and 2, a vehicle 10 includes an engine 12 that drives a transmission 14. The transmission 14 is either an automatic or a manual transmission that is driven by the engine 12 through a corresponding torque converter or clutch 16. Air flows into the engine 12 through a throttle 13. The engine 12 includes N cylinders 18. One or more of the cylinders 18 are selectively deactivated during engine operation. Although FIG. 1 depicts eight cylinders (N=8), it is appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18. The engine 12 also drives accessory loads including an alternator 22 via a belt drive 34, which includes a tensioner 36.

A control module 38 communicates with the engine 12 and various inputs and sensors as discussed herein. A vehicle operator manipulates an accelerator pedal 40 to regulate the throttle 13. More particularly, a pedal position sensor 42 generates a pedal position signal that is communicated to the control module 38. The control module 38 generates a throttle control signal based on the pedal position signal. A throttle actuator (not shown) adjusts the throttle 13 based on the throttle control signal to regulate air flow into the engine 12.

The vehicle operator manipulates a brake pedal 44 to regulate vehicle braking. More particularly, a brake position sensor 46 generates a brake pedal position signal that is communicated to the control module 38. The control module 38 generates a brake control signal based on the brake pedal position signal. A brake system (not shown) adjusts vehicle braking based on the brake control signal to regulate vehicle speed. An engine speed sensor 48 generates a signal based on engine speed. An intake manifold absolute pressure (MAP) sensor 50 generates a signal based on a pressure of the intake manifold 20. A throttle position sensor (TPS) 52 generates a signal based on throttle position.

The belt drive 34 is driven by a crankshaft 51 and a pulley 53. The belt drive 34 engages and rotates an alternator pulley 54, which drives the alternator 22. The alternator 22 generates power to recharge an energy storage device 56. The energy storage device 56 can include, but is not limited to, a battery, a capacitor, a super-capacitor, or combination thereof. A voltage regulator 58 adjusts a charging duty cycle or load of the alternator 22 based on signals from the control module 38. It can be appreciated that the voltage regulator 58 can be an integrated component of the alternator 22. When a voltage of the energy storage device 56 is below a desired operating voltage (e.g., 14.4 V), the control module 38 signals the voltage regulator 58 to operate the alternator 22 at a specified charging duty cycle to produce charging current. When a voltage of the energy storage device 56 is above the desired operating voltage, the control module 38 signals the voltage regulator 58 to cease alternator operation. In this manner, the charging duty cycle of the alternator 22 is adjustable. The control module 38 varies the charging duty cycle or alternator load according to the alternator load control system, as explained in further detail below.

The state of charge (SOC) of the energy storage device 56 is determined by the control module 38 based on a terminal voltage signal ($V_t$) and a terminal current signal ($I_t$). These values are directly measured by corresponding sensors (not shown). The SOC indicates the amount of usable energy stored within the energy storage device 56 at a given time. It is analogous to the amount of fuel in a fuel tank. In order to improve life and overall performance of the energy storage device 56, it is desired to maintain the energy storage device 56 at an optimal SOC.

When light engine load occurs, the control module 38 transitions the engine 12 to the deactivated mode. In an exemplary embodiment, N/2 cylinders 18 are deactivated, although one or more cylinders may be deactivated. Upon deactivation of the selected cylinders 18, the control module 38 increases the power output of the remaining or activated cylinders 18. The inlet and exhaust ports (not shown) of the deactivated cylinders 18 are closed to reduce pumping losses.

The engine load is determined based on the intake MAP, cylinder mode and engine speed. More particularly, engine load is based on manifold vacuum, which is the difference between MAP and the atmospheric pressure. For purposes of discussion, MAP will be used in the foregoing discussion. If MAP is below a threshold level for a given RPM, the engine load is deemed light and the engine 12 is operated in the deactivated mode. If MAP is above the threshold level for the given RPM, the engine load is deemed heavy and the engine 12 is operated in the activated mode. An exemplary threshold level is 95 kPa. The control module 38 controls the engine 12 based on the alternator load control system to maintain engine operation in the more fuel efficient regions and to extend the time during which the engine 12 operates in the deactivated mode.

The alternator load control system of the present invention regulates the alternator load to affect MAP during engine operation. More particularly, as the alternator load is increased, the load on the engine 12 is increased, thereby increasing MAP. Conversely, as the alternator load is decreased, engine load is decreased, thereby decreasing MAP.

The alternator load is controlled based on MAP. For example, as MAP increases, the alternator load decreases to maintain engine operation below the threshold level for as long as possible. In this manner, engine operation in the deactivated mode is extended, thereby increasing engine operating efficiency. More specifically, when the engine 12 is operating in the activated mode (i.e., less efficient than the deactivated mode), the engine 12 must operate at a MAP lower than the threshold level for a threshold time before transitioning to the deactivated mode. The threshold time can be considered lost time for operating the engine 12 in the deactivated mode. The decreased alternator load reduces the occurrences of transitioning to the activated mode. As a result, engine operating time in the deactivated mode (i.e., more efficient than the activated mode) is extended and there are reduced occurrences of transitioning back to the activated mode (i.e., efficiency losses waiting for the threshold time period to expire before transitioning to the deactivated mode are reduced). In some instances, however, MAP will exceed the threshold level regardless of the reduction in alternator load and engine operation will transition to the deactivated mode.

As MAP decreases, the alternator load increases to maintain efficient engine operation. More particularly, engine operation is more efficient at higher MAPs because intake stroke pumping work is reduced and thermal efficiency is increased as compared to a lower MAP. As a result, the time at which the engine 12 operates efficiently is extended.

Figure 3:
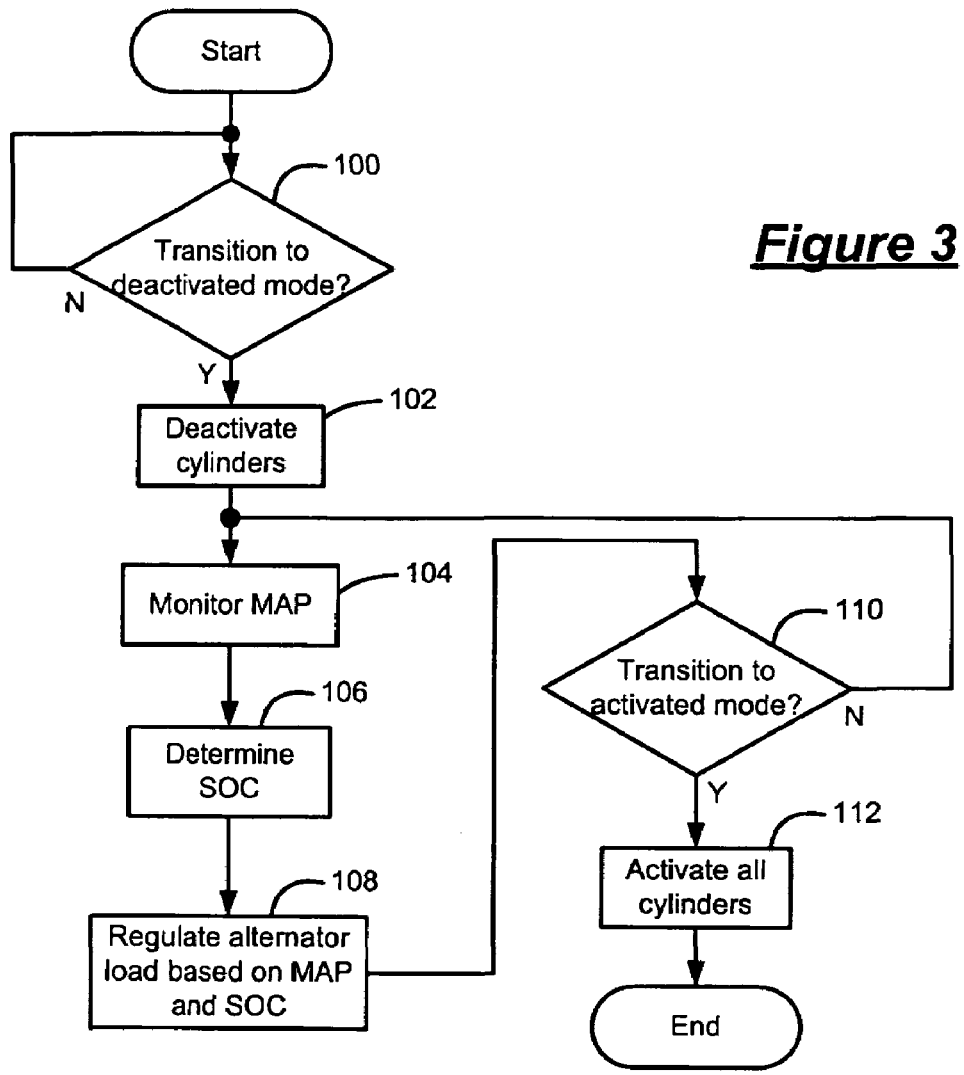
FIG. 3 is a flowchart illustrating the alternator load control according to the present invention.

Referring now to FIG. 3, the alternator load control system will be described in detail. In step 100, control determines whether to transition to the deactivated mode. If control determines not to transition to the deactivated mode, control loops back. If control determines to transition to the deactivated mode, control deactivates select cylinders 18 in step 102.

In step 104 control monitors MAP. Control determines SOC in step 106. In step 108, control regulates the alternator load based on MAP and SOC. More particularly, control increases the alternator load as MAP decreases. In this manner, engine operation is maintained at a more fuel efficient operating range. Control decreases the alternator load as MAP increases to extend engine operation time in the deactivated mode, as discussed in more detail above. In step 110, control determines whether to transition to the activated mode. If control determines not to transition to the activated mode, control loops back to step 104. If control determines to transition to the activated mode, control activates all of the cylinders 18 in step 112 and control ends.

Figure 4:
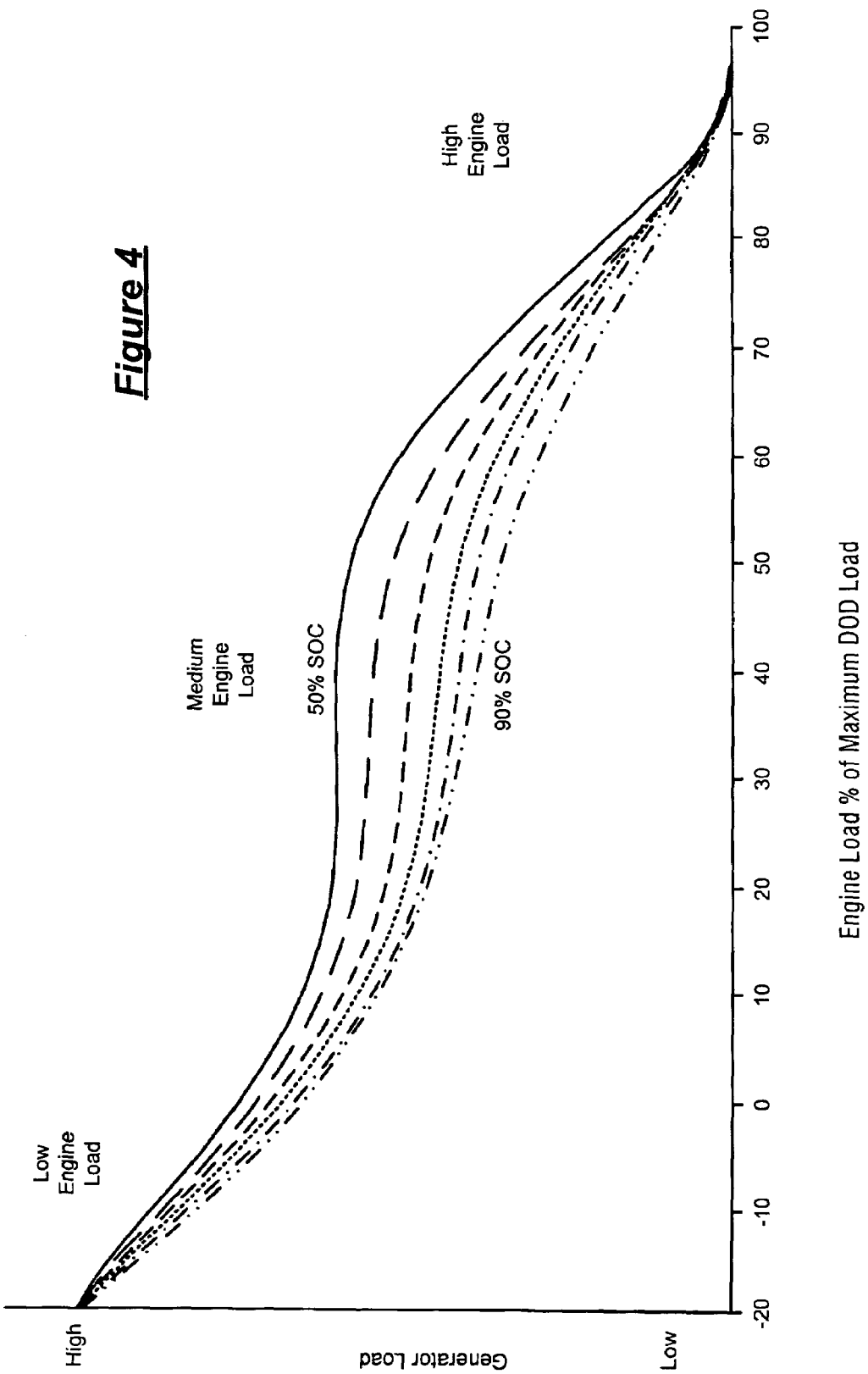
FIG. 4 is a graph illustrating alternator load curves based on battery state of charge (SOC)

Referring now to FIG. 4, exemplary alternator load curves are illustrated for the alternator load control. As discussed above, the alternator load is regulated based on MAP and SOC. The alternator load control regulates the alternator load based on a corresponding SOC curve. Smooth transitions in alternator load occur as engine load transitions between low and medium ranges. Similarly, smooth transitions in alternator load occur as the engine load transitions between medium and high ranges. There is less of an alternator load transition in the medium engine load range.

Figure 5:
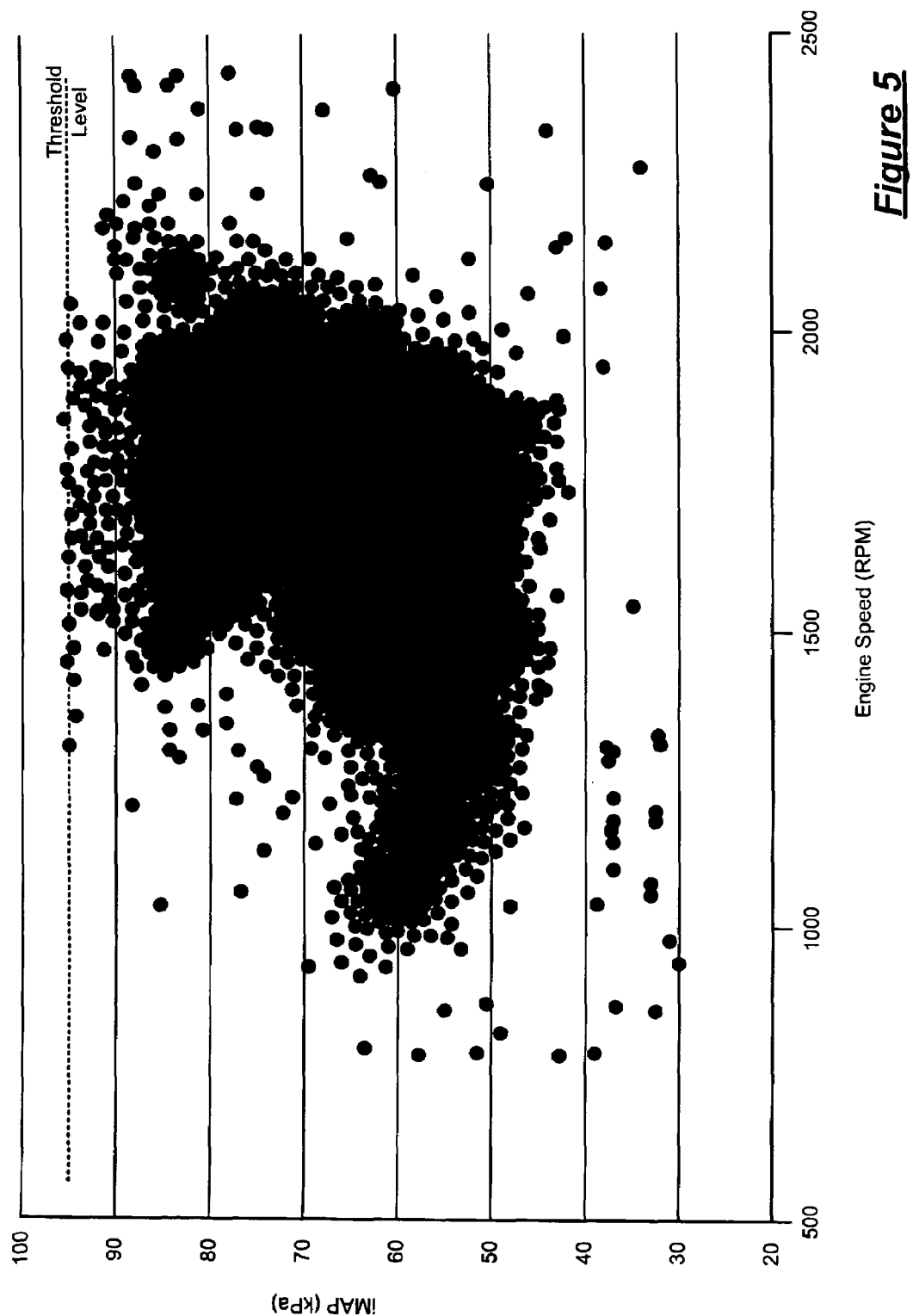
FIG. 5 is a graph illustrating exemplary engine operating points for engine operation in the deactivated mode using traditional control strategies.
Figure 6:
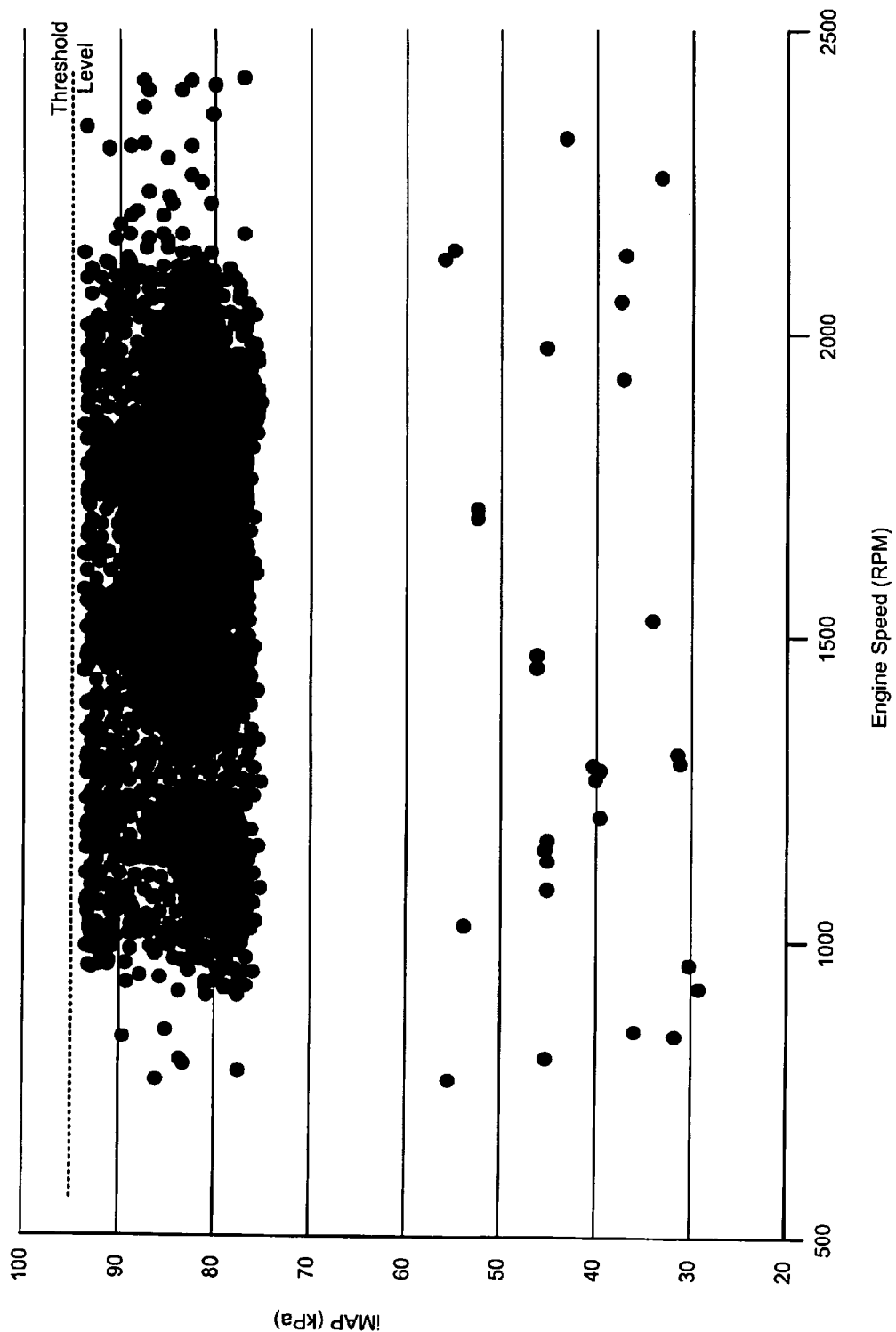
FIG. 6 is a graph illustrating exemplary engine operating points for engine operation in the deactivated mode using the alternator load control of the present invention.

Referring now to FIGS. 5 and 6, the effect of the alternator load control on engine operation will be described in more detail. FIG. 5 is a graph illustrating exemplary engine operating points in the deactivated mode using traditional engine control. A significant portion of the engine operating points occur at lower MAPs (e.g., less than 70 kPA) where engine operation is less efficient. Additionally, several engine operating points occur right at or near the threshold level, causing a transition to the activated mode.

FIG. 6 is a graph illustrating exemplary engine operating points in the deactivated mode using the alternator load control of the present invention. A significant portion of the engine operating points occur at more efficient levels (e.g., greater than 70 kPa). Additionally, the engine operating points are held sufficiently below the threshold level to reduce occurrences of transitioning to the activated mode. As a result, engine operation is more efficient and engine operation in the deactivated mode is extended as compared to traditional engine control.

Figure 7:
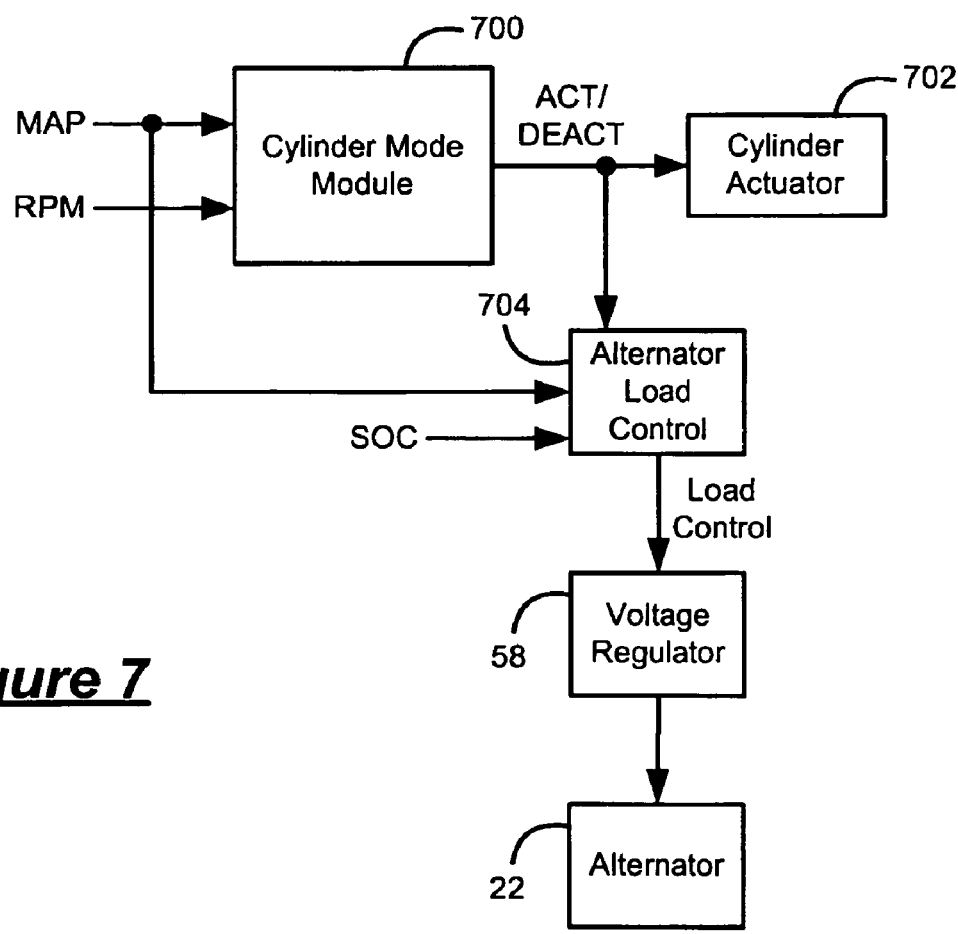
FIG. 7 is a logic diagram illustrating exemplary modules that execute the alternator load control of the present invention.

Referring now to FIG. 7, the logic flow of the DOD engine control will be described in detail. A cylinder mode module 700 receives MAP and RPM signals and generates a cylinder activation or deactivation signal based thereon. The cylinder activation or deactivation signal is sent to a cylinder actuator module 702 and an alternator load control module 704. The cylinder actuator 702 deactivates or activates selected cylinders based on the activation or deactivation signal. The alternator load control module 704 generates load control signals based on the SOC and MAP. The load control signal is sent to the voltage regulator 58, which manipulates operation of the alternator 22 according to the alternator load control described above.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system for controlling engine operation in activated and deactivated modes in a displacement on demand engine, comprising:
    an alternator that is driven by said engine and that is regulated by a load control signal; and
    an alternator load control module that generates said load control signal based on a manifold absolute pressure (MAP) to regulate a load of said alternator on said engine to maintain said MAP below a threshold level and within an efficient operating range, wherein said load is inversely proportional to said MAP.

2. The engine control system of claim 1 further comprising an energy storage device that is charged by said alternator.

3. The engine control system of claim 2 wherein said load control signal is further based on a state of charge (SOC) of said energy storage device.

4. The engine control system of claim 1 wherein said load increases as said MAP decreases to maintain said MAP within said efficient operation range.

5. The engine control system of claim 1 wherein said load decreases as said MAP increases to maintain said MAP below said threshold level.

6. A method of controlling engine operation in activated and deactivated modes in a displacement on demand engine, comprising:
    monitoring a manifold absolute pressure (MAP) of said engine; and
    regulating an alternator load on said engine based on said MAP to maintain said MAP below a threshold level and within an efficient operating range, wherein said load is inversely proportional to said MAP.

7. The method of claim 6 wherein said step of regulating comprises:
    increasing said alternator load as said MAP decreases to maintain said MAP within said efficient operation range; and
    decreasing said alternator load as said MAP increases to maintain said MAP below said threshold level.

8. The method of claim 6 further comprising charging an energy storage device based on said alternator load.

9. The method of claim 8 further comprising determining a state of charge (SOC) of said energy storage device, wherein regulating said alternator load is further based on said SOC.

10. An engine control system for controlling engine operation in activated and deactivated modes in a displacement on demand engine, comprising:
    an engine mode module that generates one of an activated signal and a deactivated signal to transition said engine between said activated and deactivated modes;
    an alternator load module that generates a load control signal based on a manifold absolute pressure (MAP) of said engine when operating in said deactivated mode; and
    an alternator control module that regulates a load of an alternator based on said load control signal to maintain said MAP below a threshold level and within an efficient operating range, wherein said load is inversely proportional to said MAP.

11. The engine control system of claim 10 further comprising an energy storage device that is charged by said alternator.

12. The engine control system of claim 11 wherein said alternator load control signal is further based on a state of charge (SOC) of said energy storage device.

13. The engine control system of claim 10 wherein said load increases as said MAP decreases to maintain said MAP within said efficient operation range.

14. The engine control system of claim 10 wherein said load decreases as said MAP increases to maintain said MAP below said threshold level.

* * * * *